(12) United States Patent  (10) Patent No.: US 8,866,108 B1
Direny  (45) Date of Patent: Oct. 21, 2014

(54) MICROTAGGING MOTOR VEHICLES FOR IDENTIFICATION FROM A PAINT SAMPLE DISCOVERED DURING A CRIMINAL INVESTIGATION

(76) Inventor: Krowker Direny, Brooklyn, NY (US)

( * ) Notice: Subject to any disclaimer, the term of this patent is extended or adjusted under 35 U.S.C. 154(b) by 0 days.

(21) Appl. No.: 13/324,530

(22) Filed: Dec. 13, 2011

Related U.S. Application Data

(63) Continuation-in-part of application No. 12/359,912, filed on Jan. 26, 2009, now abandoned.

(51) Int. Cl.
*H05B 33/00* (2006.01)

(52) U.S. Cl.
USPC .................................................... 250/484.4

(58) Field of Classification Search
CPC ..... A01B 12/06; H05B 33/00; G01N 33/2882
USPC ............... 250/484.4, 459.1, 458.1, 566
See application file for complete search history.

(56) References Cited

U.S. PATENT DOCUMENTS

| 3,772,200 | A |  | 11/1973 | Livesay |
| 4,053,433 | A |  | 10/1977 | Lee |
| 4,131,064 | A |  | 12/1978 | Ryan et al. |
| 4,390,452 | A | * | 6/1983 | Stevens ...................... 252/408.1 |
| 5,411,799 | A |  | 5/1995 | Loving |
| 5,760,394 | A | * | 6/1998 | Welle ............................ 250/303 |
| 6,309,690 | B1 |  | 10/2001 | Brogger et al. |
| 6,432,715 | B1 |  | 8/2002 | Nelson et al. |
| 6,692,031 | B2 |  | 2/2004 | McGrew |
| 6,708,618 | B1 |  | 3/2004 | Tsai |
| 7,055,691 | B2 |  | 6/2006 | Safian |
| 7,288,320 | B2 |  | 10/2007 | Steenblik et al. |
| 7,619,819 | B2 |  | 11/2009 | Moon et al. |
| 2009/0084981 | A1 |  | 4/2009 | Bown et al. |

FOREIGN PATENT DOCUMENTS

| GB | 1.487.967 | 2/1975 |
| WO | WO99/42613 | 8/1999 |
| WO | WO2007/092941 | 8/2007 |

* cited by examiner

*Primary Examiner* — David Porta
*Assistant Examiner* — Faye Boosalis
(74) *Attorney, Agent, or Firm* — Michael I. Kroll (57) ABSTRACT

A vehicle microtagging system employs vehicle paint to assist in tracking vehicles used in criminal activity. Microscopic microtag particles mixed into vehicle paint contain unique alphanumeric code sequences. These particles are designed to be left behind at a crime scene, later to be recovered by law enforcement. When the microtag particles are recovered from a crime scene, law enforcement uses a simple UV light test and a magnification instrument to identify the unique alphanumeric code sequence within the microtag particles.

18 Claims, 10 Drawing Sheets

MICROTAGGING MOTOR VEHICLES FOR IDENTIFICATION FROM A PAINT SAMPLE DISCOVERED DURING A CRIMINAL INVESTIGATION

RELATED APPLICATIONS

This application is a Continuation-In-Part of U.S. patent application Ser. No. 12/359,912, having a filing date 26 Jan. 2009 now abandoned.

Please incorporate by reference all information in said patent applications into this continuation-in-part application.

BACKGROUND OF THE INVENTION

1. Field of the Invention

The present invention relates generally to microtagging and, more specifically, to microtagging identification technology in conjunction with vehicle paint to assist in tracking vehicles used in criminal activity.

The microtag particles mixed in vehicle paint are essentially unique alphanumeric code sequences in a microscopic format. Sequences are certified and registered on a database with the department of motor vehicles and law enforcement.

When the microtagged particles are recovered from a crime scene, law enforcement uses a simple UV light test and a magnification instrument to identify the unique code sequence within the microtag particles.

2. Description of the Prior Art

There are other tagging methods designed for similar purposes. Typical of these is U.S. Pat. No. 3,772,200 issued to Livesay on Nov. 13, 1973.

Another patent was issued to Ryan et al. on Dec. 26, 1978 as U.S. Pat. No. 4,131,064. Yet another U.S. Pat. No. 5,411,799 was issued to Loving on May 2, 1995 and still yet another was issued on Oct. 30, 2001 to Brogger et al. as U.S. Pat. No. 6,309,690.

Another patent was issued to Nelson et al. on Aug. 13, 2002 as U.S. Pat. No. 6,432,715. Yet another U.S. Pat. No. 6,692,031 was issued to McGrew on Feb. 17, 2004. Another was issued to Tsai on Mar. 23, 2004 as U.S. Pat. No. 6,708,618 and still yet another was issued on Jun. 6, 2006 to Safian as U.S. Pat. No. 7,055,691.

Another patent was issued to Steenblik et al. on Oct. 30, 2007 as U.S. Pat. No. 7,288,320. A U.K. Patent No. 1,487,967 was issued to Livesay on Oct. 5, 1977. An international application was published to Drukier on Aug. 26, 1999 as International Patent Publication No. WO99/42613 and still yet another was published on Aug. 16, 2007 to Natan et al. as International Patent Publication No. WO2007/092941.

U.S. Pat. No. 3,772,200

Inventor: Richard Livesay

Issued: Nov. 13, 1973

A method of tagging individual units of production of a substance comprising the steps of: (1) providing microparticles of a refractory carrier material of characteristic geometric shape and size, the broadest dimensions of which are not less than one nor more than 250 microns, containing tagging elements in amounts of at least 0.1 percent of the total weight, which microparticles have a density greater than 3.3 g./cc. and survive ashing at 400°-500° C.; (2) providing an inventory of batches of microparticles, each batch being uniformly coded by incorporation in the microparticles of a selected combination of the tagging elements, which inventory includes up to $(L+1)N-1$ uniquely coded batches of microparticles where L is the number of discrete concentration levels at which the individual elements are used and N is the number of available tagging elements, and the microparticles of at least some of the batches contain at least three tagging elements, (3) maintaining a record of the particular elements and their levels employed in each batch of microparticles, and (4) incorporating microparticles from any one batch with only one unit of production of the substance, recovery of a single microparticle being sufficient to identify the unit of production of the substance.

U.S. Pat. No. 4,131,064

Inventor: Frederick Ryan et al.

Issued: Dec. 26, 1978

Small particles for tagging of objects to be identified comprise luminescent material plus other material which provides information indicia for tagging purposes. Included in the tagging particles are very small particles of magnetic material which is reflective both for the radiations which excite the luminescent material and also for the radiations generated by the excited luminescent material. The inclusion of the reflective magnetic particles introduces only a minimal decrease in the effectiveness of the luminescent material to provide a spotting or locating function. The particles may thus be located either by their luminescent response, or by magnetic pickup, or both. Inorganic species of these particles are especially useful for tagging explosives for post-explosion identification of the explosives.

U.S. Pat. No. 5,411,799

Inventor: Charles Loving

Issued: May 2, 1995

A microtag cut from a sheet of plastic material and having at least one acuminate snag extending outwardly from the microtag. The sheet of plastic material includes a serial number replicated a plurality of times and the microtag is cut so as to contain at least one complete serial number. Each microtag is less than about two millimeters in diameter. The plastic material is nonconductive and can be from a plastic that will fluoresce under certain wavelengths of light. A plurality of microtags can be used to mark an item of personal property.

U.S. Pat. No. 6,309,690

Inventor: Brian Brogger et al.

Issued: Oct. 30, 2001

A system and method using microcoded marks provides retrospective identification of articles. An article is marked with microparticles having multiple layers. The particles form a unique spatial pattern on the article. An image is made of the mark as applied to the article. The digitized image is stored in a database with information about the article. The database can be accessed by users to verify the authenticity of an article.

U.S. Pat. No. 6,432,715

Inventor: Gregory Nelson et al.

Issued: Aug. 13, 2002

A method for marking or tagging individual microparticles using a near infrared fluorophore for identification is provided. The near infrared fluorophore is included with one or more layers comprising the microparticle. Desirably, the coating layers contain colorants such as dyes and/or pigments which increases the total possible combinations that may be used to identify the marked material. There is further provided a method for marking a material using these microparticles containing a near infrared fluorophore.

U.S. Pat. No. 6,692,031

Inventor: Stephen McGrew

Issued: Feb. 17, 2004

Quantum dots are used as fluorescent taggants in security inks, papers, plastics, explosives, or any other item or substance in which it is desired to provide a distinct signature or marking. Quantum dots of specific sizes, compositions and structures may be used to produce specific fluorescence, mixtures of quantum dots can be used to produce random patterns of spectrally varying fluorescence, and particular quantum dot structures can be used to provide desirable physical and optical properties. The quantum dots may be read with an optical reader, which may be combined with readers using other technologies.

U.S. Pat. No. 6,708,618

Inventor: Chialun Tsai

Issued: Mar. 23, 2004

An apparatus for authenticating an object on the basis of incorporating onto the object at least one security feature known as a microdot which includes plural unique microscopic patterned markers each of which include indicia and the method of making such microdots.

U.S. Pat. No. 7,055,691

Inventor: John Safian

Issued: Jun. 6, 2006

An improvement to a package is provided that includes a container having a label secured thereto by an adhesive and a closure secured to the container. The improvement is for identifying the package and includes at least one of the container, the adhesive and the closure having a plurality of micro-particle taggants with multiple colored layers to provide a code for identifying the package.

U.S. Pat. No. 7,288,320

Inventor: Richard Steenblik et al.

Issued: Oct. 30, 2007

Microstructured taggant particles, their applications and methods of making the same are described. Precisely formed taggant particles can be formed, in the range of 500 mu and smaller, from either inert polymers or biodegradable materials bearing information indicia, such as through specific shape, size, color, reflectivity, refractive index, surface geometry, imprinting, optical effect or properties, and electromagnetic properties, to uniquely tag, identify or authenticate articles.

U.K. Patent Number GB 1,487,967

Inventor: Richard Livesay

Issued: Oct. 5, 1977

An explosive composition comprising explosive material and microparticles of a tack free organic carrier which does not have a softening point below 60° C., which microparticles have a distinctive shape, contain one or more tagging elements each in an amount of at least 0.1 percent of the total weight, and which are capable of surviving detonation of the explosive material and so permit retrospective identification of the explosive although it has been detonated.

International Patent Publication Number WO99/42613

Inventor: Andrzj Drukier

Issued: Aug. 26, 1999

Methods and additives for tagging and subsequently detecting commercial products, including industrial liquids, are disclosed. These methods permit the identification of such tags after very high, say 10<−11> dilutions. The present invention encompasses a method of microtagging a liquid, subsequently detecting that the liquid has been microtagged and identifying the liquid, which comprises (i) adding to the liquid an additive comprising at least one signal means which may be detected after extreme dilution, and a coding means to aid in identification of the liquid; (ii) obtaining a sample of the liquid containing said additive; (iii) detecting the presence in the liquid sample of said at least one signal means; (iv) and decoding said coding means, thereby detecting that the liquid had been microtagged and identifying the liquid sample.

International Patent Publication Number WO2007/092941

Inventor: Michael Natan et al.

Issued: Aug. 16, 2007

Methods and systems for the use of Surface Enhanced Raman Scattering nanotags (SERS nanotags) to create homogeneous (no-wash), heterogeneous or sequence detection assay platforms. In certain embodiments the SERS nanotags are used in combination with magnetic particles. Multiplexed assay platforms are also disclosed. In certain embodiments, the assay is useful for clinical proteomics. Assay platforms suitable for use within a biological matrix, for example within whole blood or serum are also disclosed. The assay formats described herein may be used to detect any analyte of interest including but not limited to the detection of cells, viruses, bacteria, proteins, DNA, RNA, or small molecules in any type of biological (animal or plant kingdom) or environmental samples including but not limited to whole blood or serum, occult samples, urine, feces, air, drinking water, phage, any organism, multicellular clumps of cells, for example, cancer tissue homogenate.

While these methods of tagging may be suitable for the purposes for which they were designed, they would not be as suitable for the purposes of the present invention, as hereinafter described. The present invention provides a method of identifying a particular vehicle involved in a motor vehicle accident by microtagging the paint used on said vehicle whereby paint residue is encoded with the vehicle identification number. The method includes providing a store of paint to be used on a motor vehicle and a store of microtags with a unique alphanumeric code, e.g., the vehicle's vehicle identification number (VIN), thereon and applying the paint and microtags in concert to the motor vehicle.

The microtagging identification technology in conjunction with vehicle paint is designed to assist in tracking vehicles used in criminal activity. The microtag particles mixed in vehicle paint are essentially unique alphanumeric code sequences in a microscopic format. Sequences are certified and registered on a database with the department of motor vehicles and law enforcement. When the microtag particles are recovered from a crime scene, law enforcement uses a simple UV light test and a magnification instrument to identify the unique vehicle code within the microtag particles.

SUMMARY OF THE PRESENT INVENTION

A primary object of the present invention is to provide a method of identifying a particular vehicle involved in a motor vehicle accident by microtagging the paint used on the vehicle whereby any paint residue is encoded with the vehicle identification number.

Another object of the present invention is to provide a method employing a store of paint to be used on a motor vehicle and a store of microtags with a unique vehicle identification number thereon and applying the paint and microtags in concert to the motor vehicle.

Yet another object of the present invention is to provide microtagging identification technology in conjunction with vehicle paint to assist in tracking vehicles used in criminal activity.

Still yet another object of the present invention is to provide microtag particles mixed in vehicle paint that are essentially unique alphanumeric code sequences in a microscopic format. Sequences are certified and registered on a database with the department of motor vehicles and law enforcement.

Another object of the present invention is to provide a method where microtag particles are recovered from a crime scene; law enforcement uses a simple UV light test and a magnification instrument to identify the unique code within the microtag particles.

Yet another object of the present invention is to provide a method for microtagging land vehicles.

Still yet another object of the present invention is to provide microtagged land vehicles, including trucks, automobiles, motorcycles and ATVs.

Another object of the present invention is to provide a method for microtagging existing motor vehicles where the vehicle identification number is recorded onto a plurality of microtags that are combined with a liquid medium to form a mixture that is sprayed onto said motor vehicle.

Yet another object of the present invention is to provide a liquid medium consisting of a paint pigment or clear coat.

Still yet another object of the present invention is to provide a method for indicating a microtagged new motor vehicle by incorporating a suffix added to the vehicle's identification number as a visual indicator that the vehicle has been microtagged, such as the letter 'M'.

Another object of the present invention is to provide a method for encrypting a microtagged vehicle identification number whereby government security services are removed from discovery for national security purposes.

Yet another object of the present invention is to provide a method for microtagging an existing motor vehicle by recording the vehicle identification number onto a plurality of microtags and mixing with a liquid medium that is applied to said motor vehicle.

Additional objects of the present invention will appear as the description proceeds.

The present invention overcomes the shortcomings of the prior art by providing a method of identifying a particular vehicle involved in a motor vehicle accident by a microtagging system wherein the paint used on the vehicle produces paint residue which is encoded with a unique vehicle identification number. The system employs a store of paint to be used on a motor vehicle and a store of microtags with the unique vehicle identification number thereon and applying the paint and microtags in concert to the motor vehicle.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the motor vehicle microtagging system of the present invention. With regard to the reference numerals used, the following numbering is used throughout the various drawing figures.

10 vehicle microtagging system
11 microtag particles
12 paint
14 vehicle
16 motor vehicle accident scene
18 hit and run victim
20 residual sample
22 tag retrieval personnel
24 unique alphanumeric sequence
26 ultraviolet light
28 magnification instrument
30 database
32 vehicle information
34 paint sprayer
36 vehicle painter
38 microtag retrieval
40. microtag indicator

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
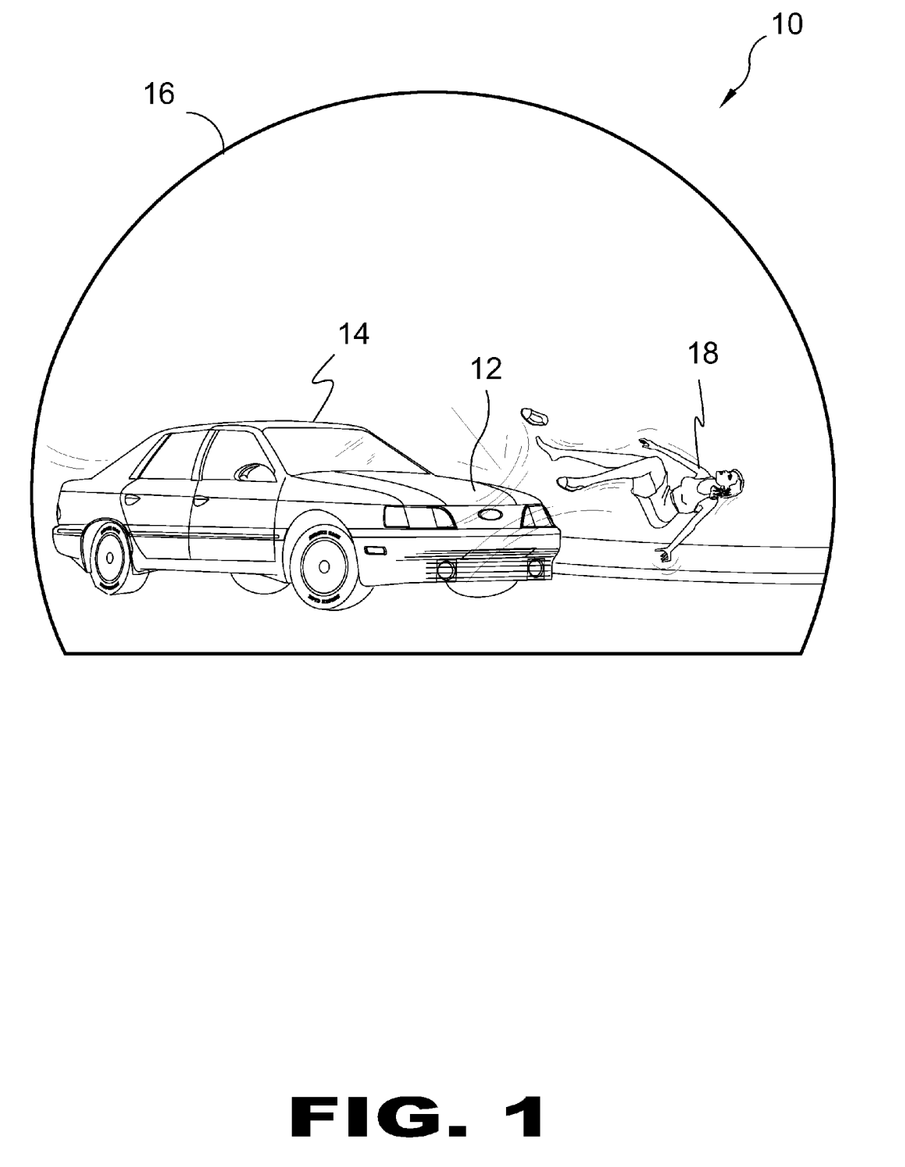
FIG. 1 is an illustrative view of the present invention in use.

FIG. 1 is an illustrative view of the present invention in use. The present invention is a vehicle microtagging system 10 which provides microscopic particles (microtags) dispersed in vehicle paint 12 to assist in identifying a vehicle 14 when only a residual sample of paint from the vehicle 14 is available, for example, as from a hit and run motor vehicle accident scene 16. Shown is a motor vehicle accident scene 16 comprising a vehicle 14 striking a hit and run victim 18. The method for identifying a motor vehicle from paint residue removed from the motor vehicle 14 comprises the steps a) providing a motor vehicle microtagging system having paint 12 applied to a motor vehicle 14 with a plurality of microtags dispersed in the paint 12, each microtag bearing the same unique alphanumeric sequence; b) recovering a residual paint sample; c) retrieving the unique alphanumeric sequence from the microtags dispersed in the residual paint sample; and d) identifying the motor vehicle 14 by the unique alphanumeric sequence.

Figure 2:
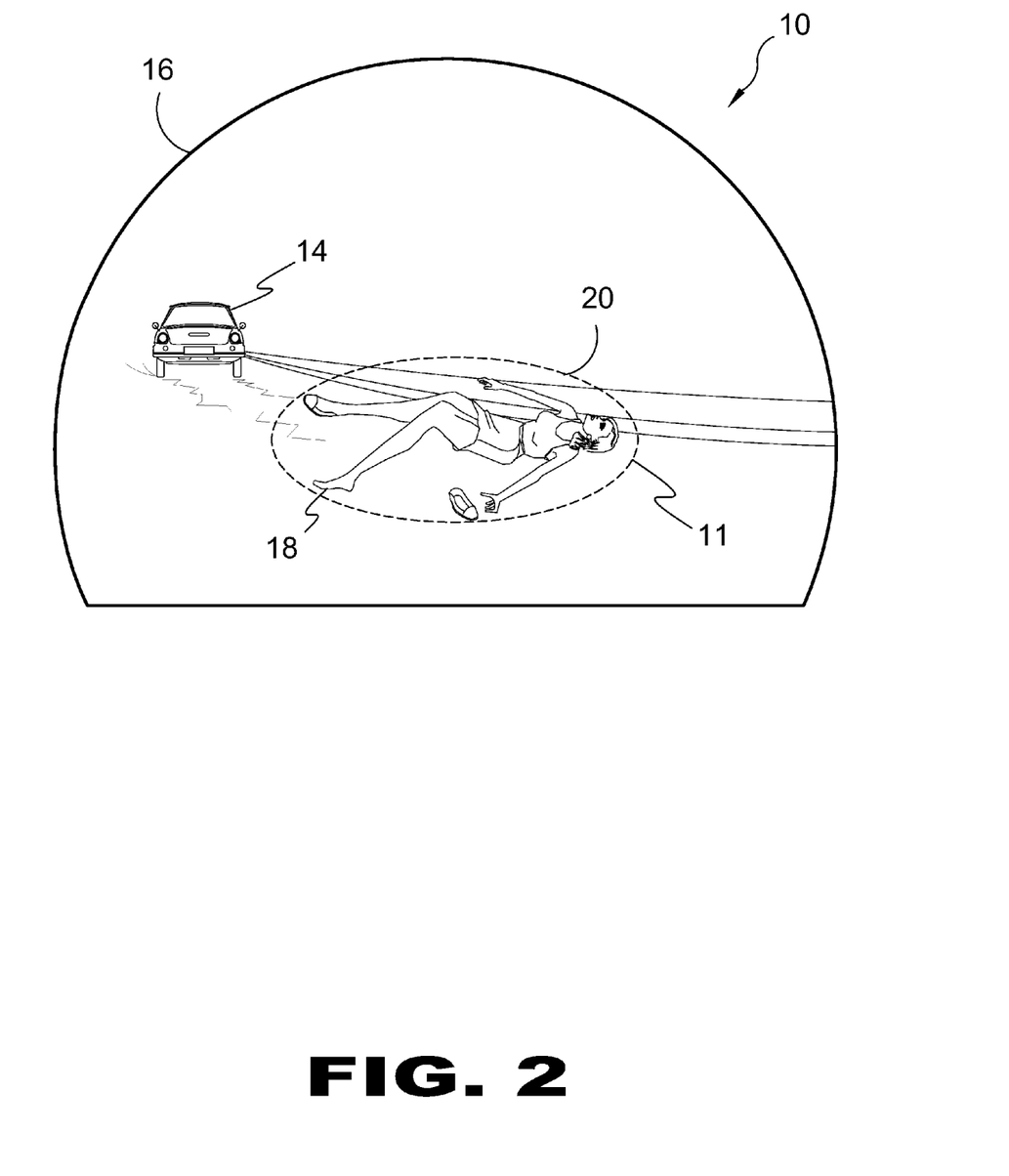
FIG. 2 is an illustrative view of the present invention in use.

FIG. 2 is an illustrative view of the present invention in use. The present invention is a vehicle microtagging system 10 which provides microscopic particles (microtags) dispersed in vehicle paint to assist in identifying a vehicle 14 when only a residual sample 20 of paint from the vehicle 14 is available, for example, as from a hit and run motor vehicle accident scene 16. Shown is a motor vehicle accident scene 16 comprising a vehicle 14 leaving an accident scene 16 after striking a hit and run victim 18. At the accident scene 16, residual samples 20 of paint, including the microtags 11, remain as evidence.

Figure 3:
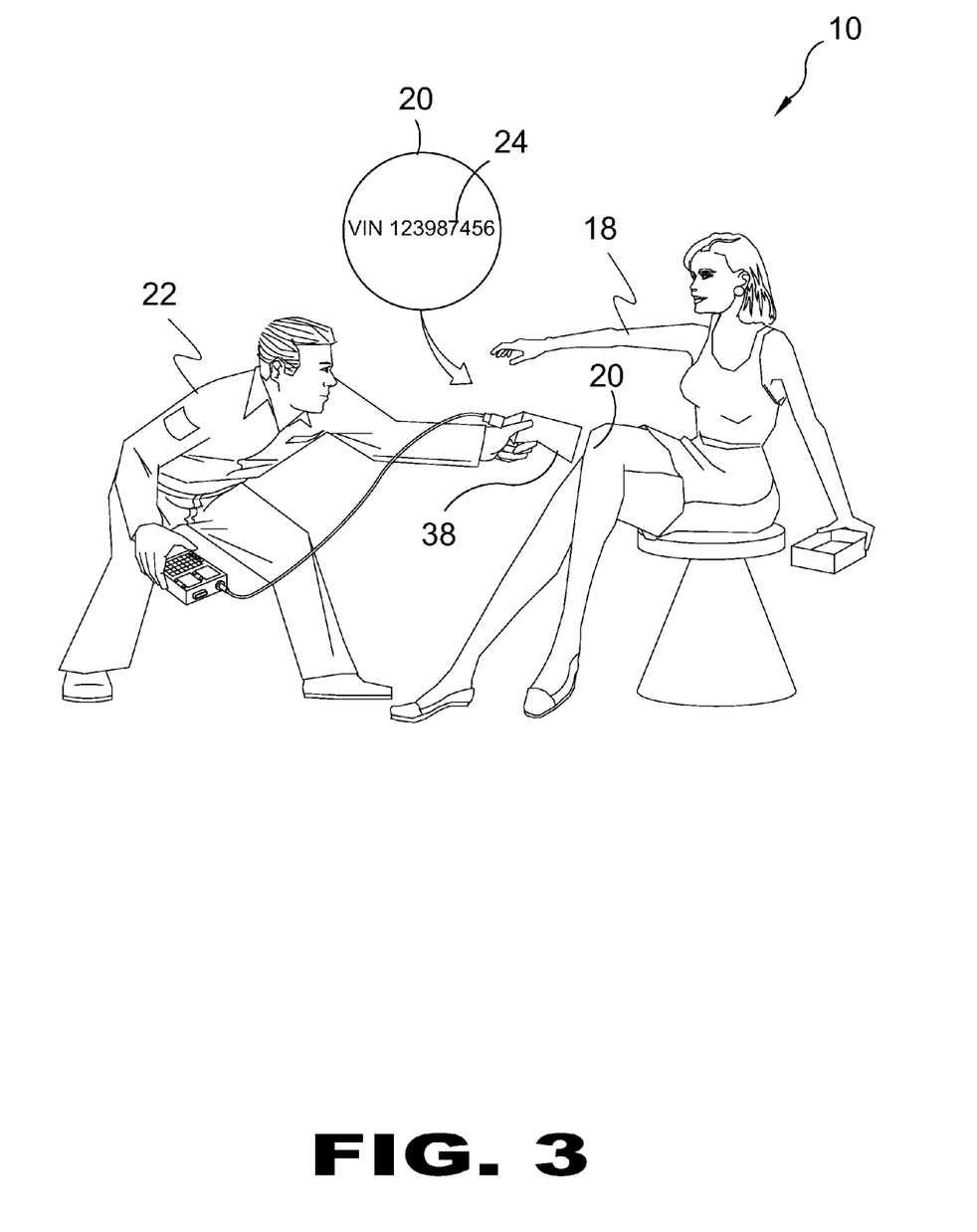
FIG. 3 is an illustrative view of the present invention in use.

FIG. 3 is an illustrative view of the present invention in use. Shown is an illustration depicting the recovery of residual samples 20 of paint including the microtags of the invention. The present invention is a vehicle microtagging system 10 which provides microscopic particles (microtags) dispersed in vehicle paint to assist in identifying a vehicle when only a residual sample 20 of paint from the vehicle is available, for example, as from a hit and run motor vehicle accident scene. At the accident scene, residual samples 20 of paint, including the microtags, remain as evidence. The residual sample 20 is identified and collected by tag retrieval personnel 22 utilizing microtag retrieval equipment 38, such as a law enforcement officer, and the unique alphanumeric sequence 24 is retrieved by means including one or more of an ultraviolet light 26 and a magnification instrument. Each microtag bears the same unique alphanumeric sequence 24, which is preferably the same as the vehicle identification number (VIN) assigned to the vehicle. Shown is the microtag retrieval personal 22 recovering a residual sample 20 off of the victim 18.

Figure 4:
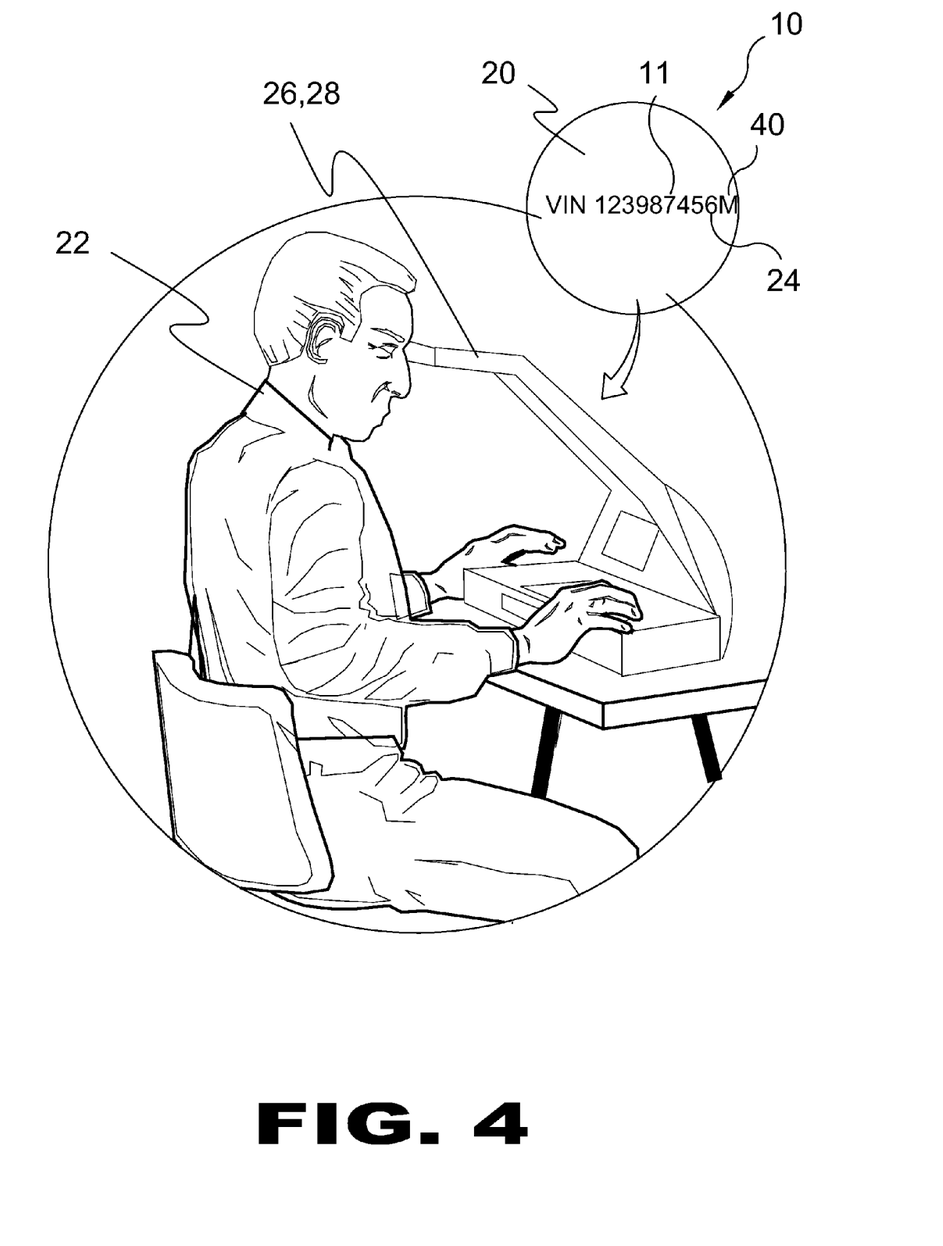
FIG. 4 is an illustrative view of the present invention in use.

FIG. 4 is an illustrative view of the present invention 10 in use. Shown is an illustration depicting the recovery of microtagging identification particles 11 mixed in residual vehicle paint samples 20. Shown is an illustration depicting the recovery and analysis of residual samples 20 of paint including the microtags 11 of the invention. The present invention is a vehicle microtagging system 10 which provides microscopic particles (microtags) 11 dispersed in vehicle paint to assist in identifying a vehicle when only a residual sample 20 of paint from the vehicle is available, for example, as from a hit and run motor vehicle accident scene. A residual sample 20 is processed by tag retrieval personnel 22, such as a law enforcement officer, and the unique alphanumeric sequence 24 having a microtag indicator 40 is retrieved by means including one or more of an ultraviolet light 26 and a magnification instrument 28. A preferred magnification instrument 28 is a 100× magnifier. Each microtag 11 bears the same unique alphanumeric sequence 24, which is preferably the same as the vehicle identification number (VIN) assigned to the vehicle.

Figure 5:
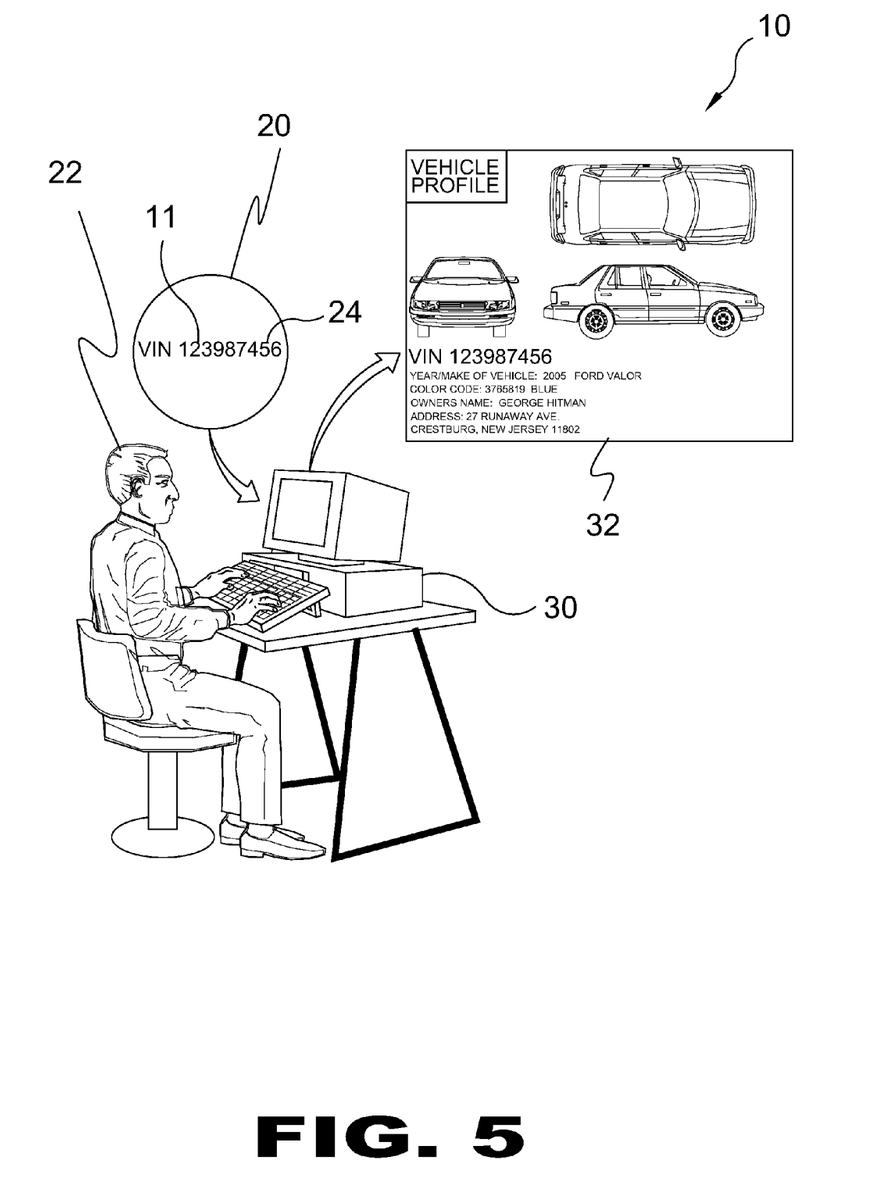
FIG. 5 is an illustrative view of the present invention in use.

FIG. 5 is an illustrative view of the present invention in use. Shown is an illustration depicting the recovery and analysis of residual samples 20 of paint including the microtags of the invention. The present invention is a vehicle microtagging system 10 which provides microscopic particles (microtags) dispersed in vehicle paint to assist in identifying a vehicle when only a residual sample 20 of paint from the vehicle is available, for example, as from a hit and run motor vehicle accident scene. A residual sample 20 is processed by tag retrieval personnel 22, such as a law enforcement officer, and the unique alphanumeric sequence 24 is retrieved by means including one or more of an ultraviolet light and a magnification instrument. Each microtag 11 bears the same unique alphanumeric sequence 24, which is preferably the same as the vehicle identification number (VIN) assigned to the vehicle. Optionally, a database 30 correlates the unique alphanumeric sequence 24 with vehicle information profile 32, the database 30 accessible in order to retrieve vehicle information 32 about a vehicle for which the alphanumeric sequence 24 is known.

Figure 6:
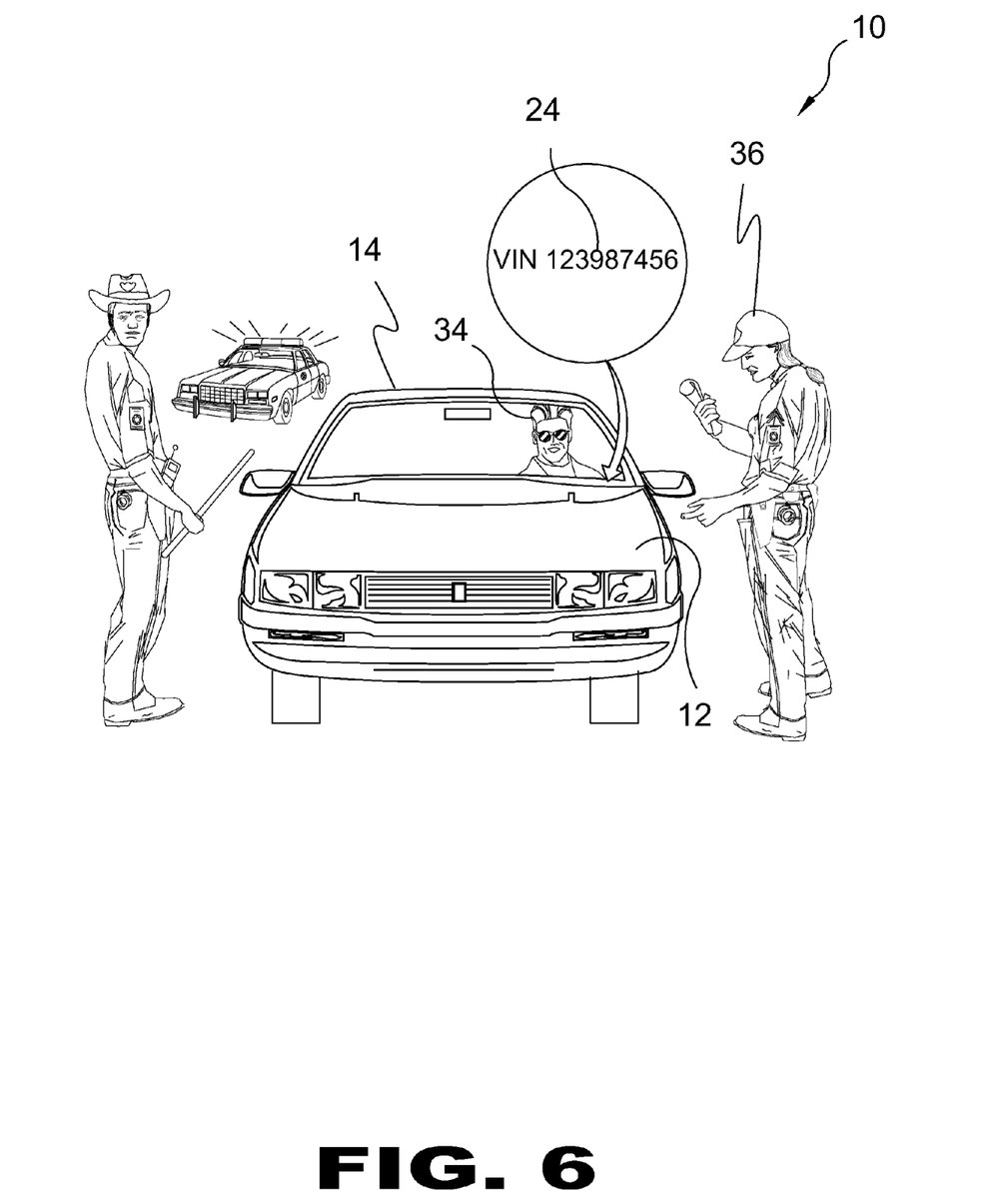
FIG. 6 is an illustrative view of the present invention in use.

FIG. 6 is an illustrative view of the present invention in use. Shown is an illustration depicting the arrest of a hit and run driver and a vehicle having the microtagging identification particles. The present invention is a vehicle microtagging system 10 which provides microscopic particles (microtags)

dispersed in vehicle paint 12 to assist in identifying a vehicle 14 when only a residual sample of paint from the vehicle 14 is available, for example, as from a hit and run motor vehicle accident scene. After the vehicle 14 is identified from the unique alphanumeric sequence 24 in the residual sample, the hit and run driver 34 can be apprehended and arrested by law enforcement personnel 36.

Figure 7:
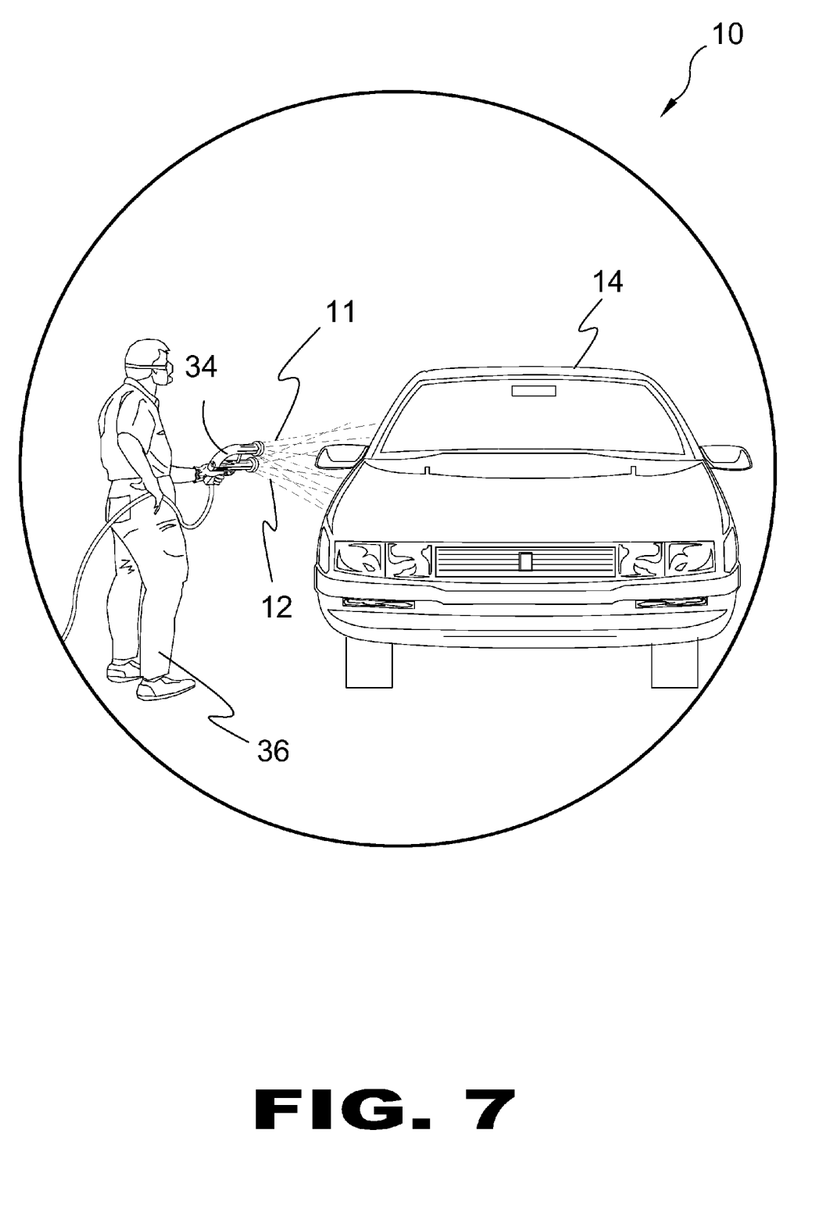
FIG. 7 is an illustrative view of the present invention in use.

FIG. 7 is an illustrative view of the present invention 10 in use. The present invention provides a method for marking a vehicle comprising the steps: a) providing a vehicle microtagging system having paint 12 for applying to a vehicle 14 and a plurality of microtags 11 dispersed in the paint, each microtag bearing the same unique alphanumeric sequence; and b) applying the paint to a vehicle, for example by means such as with a paint sprayer 34, applied by a vehicle painter 36.

Figure 8:
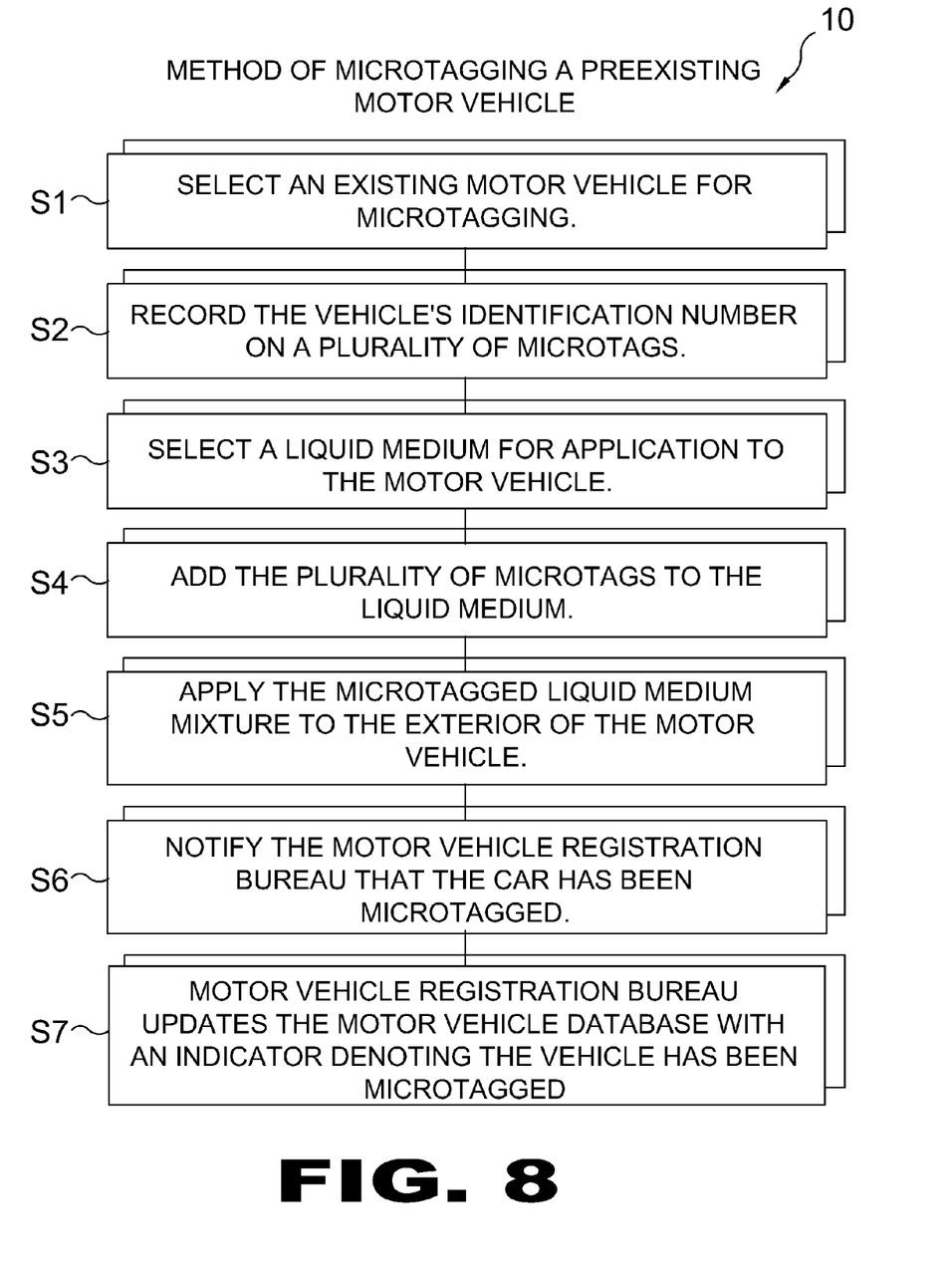
FIG. 8 is a block diagram of a method of microtagging a pre-existing motor vehicle.

FIG. 8 is a block diagram of a method of microtagging a pre-existing motor vehicle. The present invention provides for elective microtagging of existing motor vehicles comprising the steps of selecting an existing motor vehicle for microtagging, as shown in S1. In step S2, the vehicle's identification number is recorded onto a plurality of microtags and a liquid medium is selected, which may be a paint pigment or clear coat, as shown in step S3. In step S4 the microtags are combined with the liquid medium to form a sprayable mixture that is applied to said motor vehicle, as shown in step S5. Once the motor vehicle has been microtagged through application of the microtagged mixture, the vehicle registration bureau is notified, shown in S6, so that the bureau's database can be updated indicating that the vehicle has been microtagged, as shown in step S7.

Figure 9:
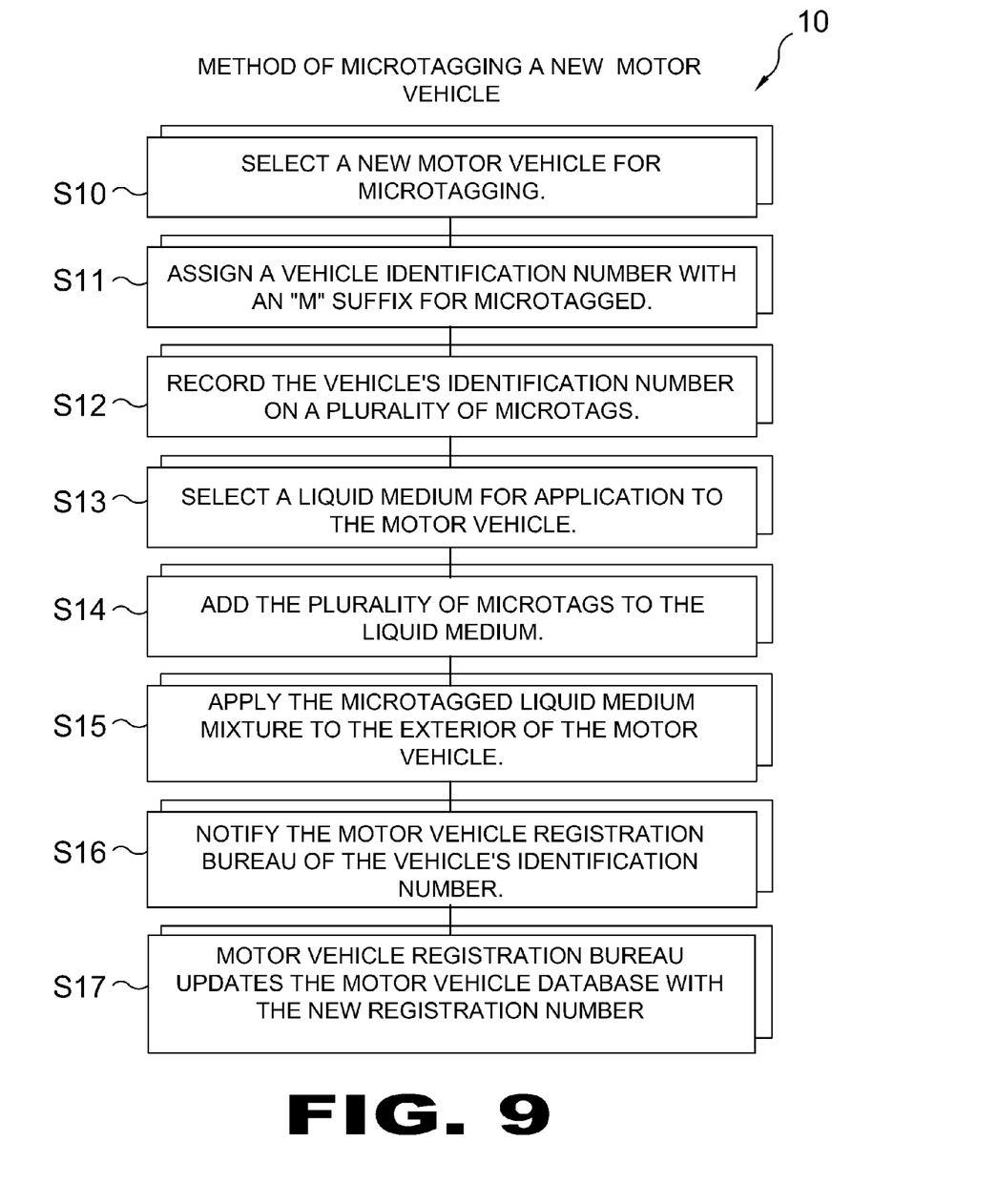
FIG. 9 is a block diagram of a method of microtagging new motor vehicles.

FIG. 9 is a block diagram of a method of microtagging new motor vehicles. The present invention provides that microtagging new motor vehicles will encourage vehicle operators to be more responsible in their operation. In step S10, a motor vehicle is selected for microtagging and a visual indicator is added to the identification number, preferably a suffix letter such as 'M', as shown in step S11. In step S12, the vehicle's identification number is recorded onto a plurality of microtags and a liquid medium is selected, which may be a paint pigment or clear coat, as shown in step S13. In step S14 the microtags are combined with the liquid medium to form a sprayable mixture that is applied to said motor vehicle, as shown in step S15. Once the motor vehicle has been microtagged through application of the microtagged mixture, the vehicle registration bureau is notified, shown in S16, so that the bureau's database can be updated indicating that the vehicle has been microtagged, as shown in step S17.

Figure 10:
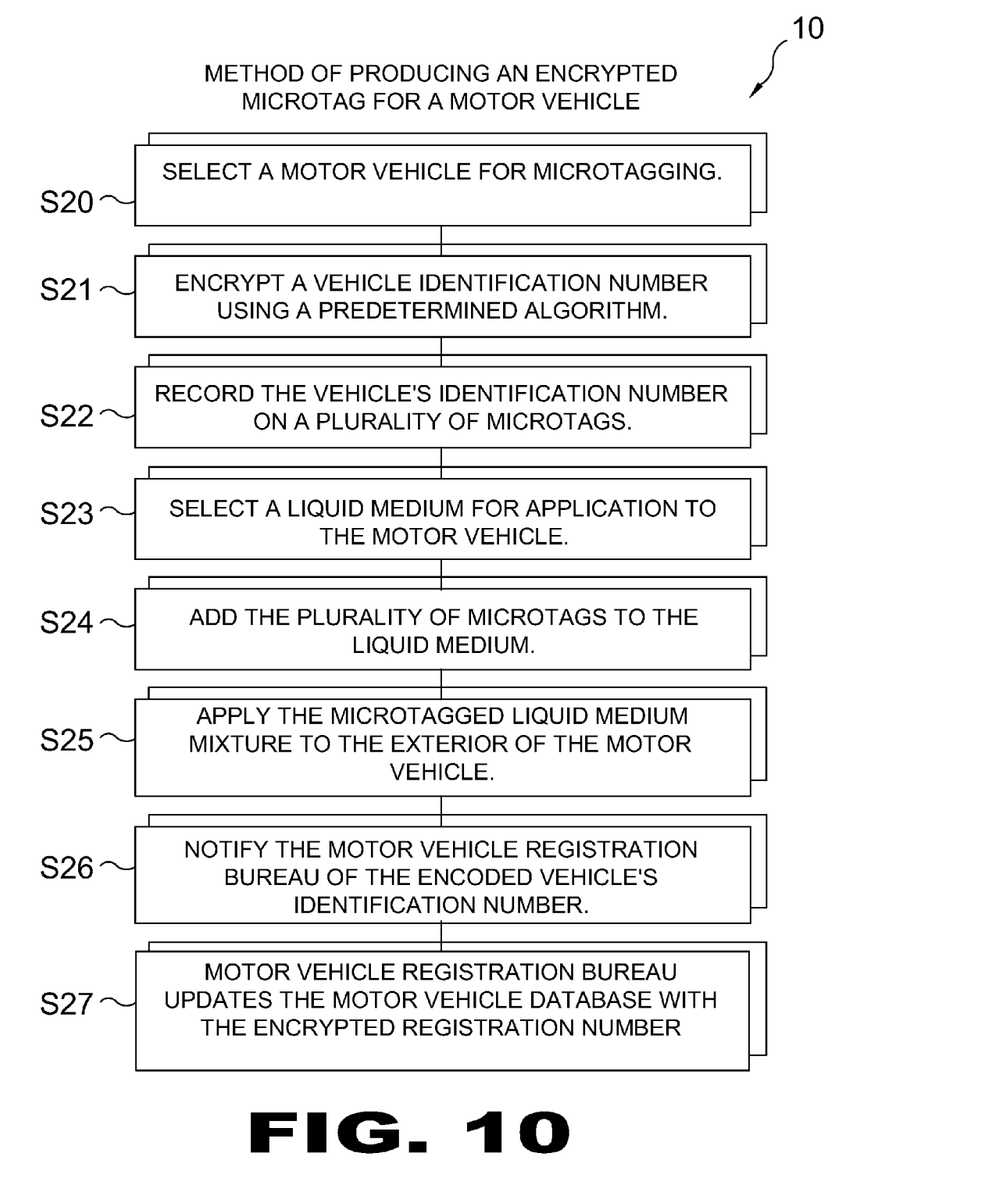
FIG. 10 is a block diagram of a method of producing an encrypted microtag for a motor vehicle.

FIG. 10 is a block diagram of a method of producing an encrypted microtag for a motor vehicle. The present invention envisions that there may be circumstances where the identity of vehicles used within a government agency require anonymity for national security purposes. Therefore, the present invention provides for encoding or encrypting the vehicle identification number. In step S20, a motor vehicle is selected for microtagging and the vehicles identification number is encrypted using a predetermined algorithm as shown in step S21. In step S22, the vehicle's identification number is recorded onto a plurality of microtags and a liquid medium is selected, which may be a paint pigment or clear coat, as shown in step S23. In step S24 the microtags are combined with the liquid medium to form a sprayable mixture that is applied to said motor vehicle, as shown in step S25. Once the motor vehicle has been microtagged through application of the microtagged mixture, the vehicle registration bureau is notified, shown in S26, so that the bureau's database can be updated indicating that the vehicle has been microtagged, as shown in step S27.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A vehicle microtagging system comprising:
    a) paint applied to a vehicle;
    b) a plurality of microtags dispersed in said paint, each microtag bearing a unique alphanumeric sequence identifying a vehicle identification number (VIN) assigned to said vehicle and readable by application of ultraviolet light and a magnification instrument; and
    c) an indicator added to the vehicle identification number indicating that the motor vehicle has been microtagged.

2. A vehicle microtagging system according to claim 1, wherein said means for applying said paint comprises a paint sprayer.

3. A vehicle microtagging system according to claim 1, further comprising means for retrieving said unique alphanumeric sequence from a residue of said paint from said vehicle.

4. A vehicle microtagging system according to claim 3, wherein said microtag is a microscopic particle.

5. A vehicle microtagging system according to claim 1, wherein said unique alphanumeric sequence is encrypted on said microtags.

6. A vehicle microtagging system according to claim 1, further comprising:
    a) a database correlating said unique alphanumeric sequence with identifying information about the vehicle; and
    b) means for accessing said database in order to retrieve information about a vehicle for which an alphanumeric sequence is known.

7. A method for marking a vehicle comprising the steps:
    a) providing a vehicle microtagging system having paint for applying to a vehicle and a plurality of microtags dispersed in said paint, each microtag bearing a unique alphanumeric sequence readable by application of ultraviolet light and microscopic magnification;
    b) applying said paint to a vehicle; and
    c) adding an indicator to a vehicle identification number assigned to said vehicle that the vehicle has been microtagged.

8. A method for marking a vehicle according to claim 7, wherein said paint is applied to said vehicle with a paint sprayer.

9. A method for marking a vehicle according to claim 7, further comprising the step of retrieving said unique alphanumeric sequence from a residue of said paint from said vehicle.

10. A method for marking a vehicle according to claim 9, wherein said microtag is a microscopic particle.

11. A method for marking a vehicle according to claim 10, further comprising the steps:
   a) providing a database correlating said unique alphanumeric sequence with identifying information about the vehicle; and
   b) accessing said database in order to retrieve information about a vehicle for which an alphanumeric sequence is known.

12. A method for identifying a motor vehicle from paint residue removed from the motor vehicle comprising the steps:
   a) providing a motor vehicle microtagging system having paint applied to a motor vehicle with a plurality of microtags dispersed in said paint, each microtag on said motor vehicle bearing a unique alphanumeric sequence identifying a vehicle identification number (VIN) assigned to said motor vehicle;
   b) recovering a residual sample of said paint;
   c) retrieving said unique alphanumeric sequence from said microtags dispersed in said residual sample of said paint by the application of ultraviolet light to said microtags and reading said alphanumeric sequence using a magnification instrument; and
   d) identifying said motor vehicle by said unique alphanumeric sequence.

13. A method for identifying a motor vehicle from paint residue removed from the motor vehicle according to claim 12, further comprising the step of adding an indicator to said VIN identifying said motor vehicle as having said microtags.

14. A method for identifying a motor vehicle from paint residue removed from the motor vehicle according to claim 13, further comprising the step of encrypting information on said microtags.

15. A method for identifying a motor vehicle from paint residue removed from the motor vehicle according to claim 14, wherein said magnification instrument is an approximately 100× magnification instrument.

16. A method for identifying a motor vehicle from paint residue removed from the motor vehicle according to claim 12, wherein said microtag is a microscopic particle.

17. A method for identifying a motor vehicle from paint residue removed from the motor vehicle according to claim 16, wherein said residual sample of paint is collected from a motor vehicle accident scene.

18. A method for identifying a motor vehicle from paint residue removed from the motor vehicle according to claim 12, further comprising the steps:
   a) providing a database correlating said unique alphanumeric sequence with identifying information about the vehicle; and
   b) accessing said database in order to retrieve information about a vehicle for which an alphanumeric sequence is known.

* * * * *